United States Patent [19]
Ishii et al.

[11] 4,044,418
[45] Aug. 30, 1977

[54] TUBE SCRUBBING APPARATUS

[75] Inventors: Masaichi Ishii, Sakai; Kazuo Mihara, Hyogo, both of Japan

[73] Assignee: Daicel Ltd., Sakai, Japan

[21] Appl. No.: 688,607

[22] Filed: May 21, 1976

[30] Foreign Application Priority Data
June 6, 1975   Japan .................... 50-68329

[51] Int. Cl.² .............................................. B08B 9/04
[52] U.S. Cl. .............................. 15/104.06 A; 137/268
[58] Field of Search ............... 15/104.06 A, 3.5, 3.51; 137/268; 134/8, 32; 302/40–42

[56] References Cited

U.S. PATENT DOCUMENTS

| | | | |
|---|---|---|---|
| 2,755,742 | 7/1956 | Vincent | 15/104.06 A X |
| 2,893,028 | 7/1959 | Scaramucci | 15/104.06 A X |
| 3,000,028 | 9/1961 | Buie et al. | 15/104.06 A |
| 3,063,080 | 11/1962 | Bergman et al. | 15/104.06 A |
| 3,146,477 | 9/1964 | Bergman et al. | 15/104.06 A |
| 3,283,354 | 11/1966 | Simmons | 15/104.06 A |
| 3,883,431 | 5/1975 | Ishii | 15/104.06 A X |

Primary Examiner—Edward L. Roberts
Attorney, Agent, or Firm—Blanchard, Flynn, Thiel, Boutell & Tanis

[57] ABSTRACT

A scrubbing apparatus comprising an outer cylinder and a rod which is longer than the cylinder and which slidably and sealingly fits within the outer cylinder. The rod has a transverse through-hole for insertion of a scrubbing element.

7 Claims, 5 Drawing Figures

TUBE SCRUBBING APPARATUS

BACKGROUND OF THE INVENTION

1. Field of the Invention

This invention relates to a device for cleaning, by a scouring or scrubbing action, the inner surface of a tube, a tubular film, such as a tubular, semipermeable membrane used for reverse osmosis or ultrafiltration separation operations, or heat exchanger tubes. The present device enables a resilient sponge ball or the like scrubbing element, hereafter referred to as a scrubbing element, to be easily inserted into and removed from a piping system.

2. Description of the Prior Art

It is well-known that substances suspended or dissolved in liquids may be deposited on the inner surfaces of tubular semipermeable membranes of reverse osmosis and ultrafiltration apparatuses, and also on the inner surfaces of heat exchanger tubes, thus resulting in a lowered efficiency of the apparatus or heat exchanger. In order periodically to remove these deposits, scrubbing elements are introduced into the piping system and are moved therethrough, with the liquid. In the prior art such as disclosed in U.S. Pat. No. 3,819,513, mesh screens are provided at both ends of the piping system. The scrubbing elements are interposed between these screens and are moved back and forth through the piping system by alternating the direction of the liquid flow through the piping system. In this prior apparatus, the scrubbing elements are contained at all times in the piping system. According to a further apparatus shown in Japanese Utility Model application No. 0153343 of 1974, the piping system is fitted with valve means for the scrubbing device and the scrubbing elements are introduced into and taken out from the piping system for each scrubbing operation. These known apparatuses have their advantages and disadvantages. With the first-mentioned apparatus, the screens must be removed for insertion and removal of the scrubbing elements. The flow of the liquid must be discontinued or the liquid must be conducted through a separate piping system during such change-over time. When the scrubbing elements are subjected to considerable wear by the scrubbing operation, the removal operation must be carried out frequently. Moreover, when the scrubbing elements have been subjected to chemical deterioration and/or physical soiling (hereafter referred to, in general, as deterioration), such as when the piping system is being sterilized, the scrubbing elements must be taken out from the piping system. On the other hand, the first-mentioned apparatus has the advantage that the regular operation and the scrubbing can be performed for an extended time with the scrubbing elements remaining in the piping system, provided that the scrubbing elements are subjected to a smaller degree of deterioration so that they remain effective for scrubbing. Moreover, the direction of the flow of the liquid through the piping system can be reversed easily by providing suitable by-pass and valve means. Hence the device can be automated without much difficulty to achieve more efficient scrubbing operation. The apparatus of the second-mentioned type has the advantage that the insertion and removal of the scrubbing elements may be facilitated by the provision of the valve means which overcomes the disadvantages inherent in the first-mentioned apparatus. However, the scrubbing elements must be inserted and removed for each scrubbing operation even though they otherwise could be allowed to remain in the piping system for an extended time. Turning to the structural aspects, with the first-mentioned system, it is necessary to provide mesh screens in at least two places in the piping system and special piping and valve means for reversing the liquid flow direction. This means that a special operation for effecting scrubbing will become necessary regardless of whether the operation is carried out manually or automatically. Moreover, when the flow direction is such that the scrubbing elements are forcibly pressed against the surrounding screen, the scrubbing elements will partially block the piping system and special means must be provided to reduce the resulting increased resistance to the flow of the liquid. Under these circumstances, the device becomes complicated in structure and more costly. With the second-mentioned apparatus as disclosed for instance in Japanese Utility Model publication No. 0153343/1974, the scrubbing element is inserted into and removed from the piping system by special valve means which are rather similar to the commonly marketed ball cocks. The ball cock housing has to be provided with three or four ports and the valve body should be fitted with a special saucer. The valve means are therefore not of the commercially available type, although they are similar in structure to the conventional ball cocks. A specialized manufacturing technique is usually involved in the manufacture of ball cocks for this special purpose. Thus, these valve means are expensive. These valve means are manufactured with a high degree of precision and, when they are obtained by remodelling commercially available devices, may give rise to leakage or operational difficulties due to the strain caused by the hot machining operation. In operation, when the valve means are revolved for insertion or removal of the scrubbing elements, the flow of the liquid must be discontinued temporarily which may cause severe danger. It may be envisaged to provide a by-pass means in the valve body, but such measures are almost impossible with the ball cocks from the structural and machining points of view and, therefore, special by-pass means must be provided in addition to the valve means.

Figure 1:
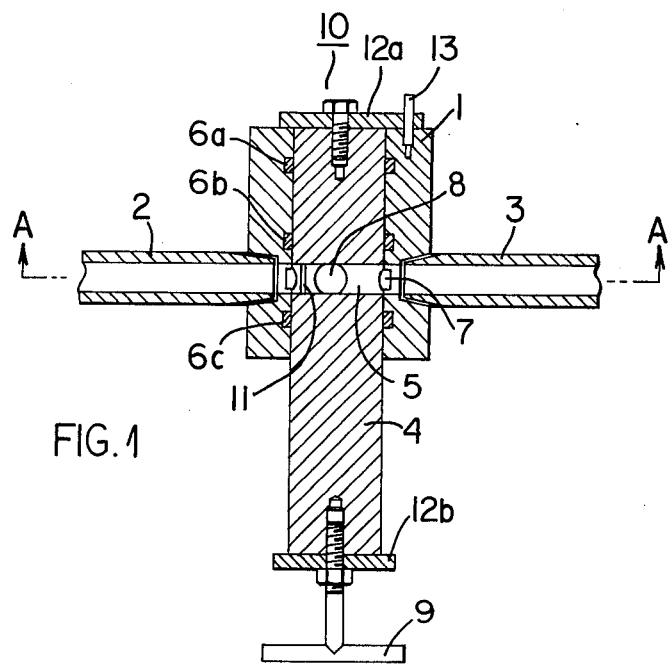
FIG. 1 is a longitudinal section showing an embodiment of the scrubbing apparatus.
Figure 2:
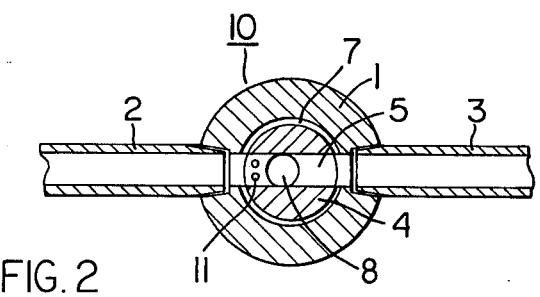
FIG. 2 is a section taken along the line A—A of FIG. 1.

An embodiment of the present invention will be explained by reference to the accompanying drawings. The scrubbing apparatus 10 shown in FIG. 1 is comprised of an outer cylinder 1 connected to pipes 2, 3. An elongated rod 4 has a transverse through-opening 5 and the rod slides within the outer cylinder 1. The through-opening 5 is used for insertion of a scrubbing element 8 into and for removal of it from the pipes 2, 3 and for providing a liquid flow passageway that interconnects pipes 2 and 3. Packing means 6a, 6b and 6c are provided at more than two, preferably three, places along the lengthwise extent of cylinder 1 for preventing leakage of liquid from the clearance spaces between the outer cylinder 1 and the rod 4. The packing means 6a, 6b and 6c are spaced apart greater distances than the diameter of the through-hole 5 so that the liquid which has leaked from the through-hole 5 when the through-hole 5 passes through the central packing 6b can be blocked by the outer packing 6a. A by-pass channel 7 is provided in the inner periphery of the outer cylinder 1 and communicates with pipes 2 and 3 to provide a by-pass for the liquid so that the liquid flow will not be discontinued when a solid portion of the rod 4 is disposed directly between the pipes 2 and 3, in order to avoid excessive pressure in the pipes 2 and 3. The effective cross-sectional area of the by-pass 7 is normally smaller than that of the through-hole 5 and preferably is of the order of about 3/100 to 30/100 of the cross-sectional area of the through-hole 5. The by-pass 7 is also of such thickness that the scrubbing element 8 inserted into the through-hole 5 is not obstructed by the liquid flow from entering the pipe 3 when the through-opening 5 and the scrubbing element 8 therein are positioned in alignment with pipes 2, 3.

Figure 3:
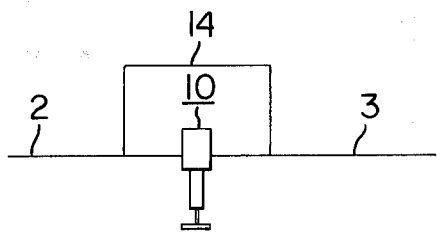
FIG. 3 is a schematic diagram showing the operation of a modified embodiment wherein a by-pass means is not provided directly to the outer cylinder.

The by-pass 7 in the outer cylinder 1 can be omitted when a separate by-pass pipe 14, as shown in FIG. 3, is used in addition to the scrubbing apparatus 10. A handle 9 is used for manually sliding the rod 4 longitudinally in the outer cylinder 1. The handle 9 can be replaced by a conventional air cylinder for remote control or automated operation. A screen 11 is provided in the through opening 5 and is located for blocking movement of the scrubbing element 8 from one pipe to the next, such as from pipe 3 to pipe 2 in FIG. 1. For operation in self-contained type system (FIG. 5), wherein the direction of flow of the liquid is reversible, as well as the removable type system (FIG. 4), wherein the liquid flows in only one direction, the two scrubbing apparatuses 10 fitted with screens 11 are mounted at the downstream and upstream sides of the piping system 3.

Plate 12a is a stop element which bears against one end of the cylinder 1 when the through opening 5 is positioned in communication with pipes 2 and 3. Plate 12b is a stop element which bears against the opposite end of the cylinder 1 when the through opening 5 is positioned outside the cylinder for inserting or removing the scrubbing element. A positioner 13 is mounted on the cylinder for registry with a notch provided in the stopper 12a to insure that the through hole 5 is aligned with the pipes 2 and 3, as shown in FIG. 1.

Figure 4:
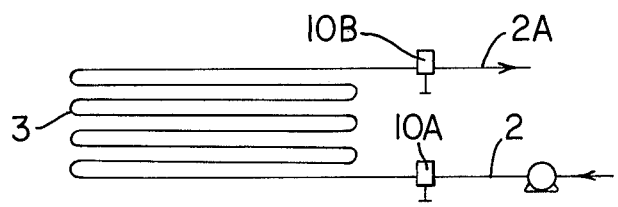
FIGS. 4 and 5 are schematic diagrams showing the operation of the piping system using the scrubbing apparatus.
Figure 5:
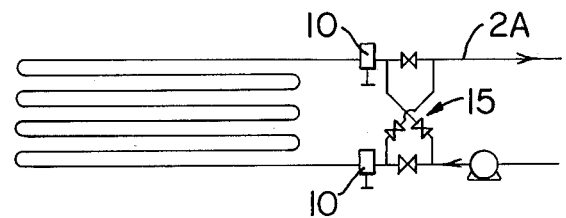

FIG. 4 shows a typical flow diagram for the removable type apparatus and FIG. 5 is a typical flow sheet for a self-contained type apparatus.

The outer cylinder 1 is mounted with the longitudinal axis of the cylinder 1 substantially perpendicular to the longitudinal axes of the upstream and downstream pipes 2, 3 of the piping system. The elongated rod 4 is longer than said outer cylinder 1 and is slidably movable within said outer cylinder. The transverse through opening 5 is formed in the rod 4 for accommodating a scrubbing element 8. The scrubbing element 8 can be introduced while the liquid is flowing through the pipes 2 and 3, by moving the rod 4 to a position in which stopper 12b connects the end of the cylinder 1 inserting the element 8 in said through opening 5 and then sliding the rod axially of the outer cylinder 1 until stopper 12a contacts the other end of the cylinder 1 and positioner 13 extends through the notch in the stopper 12a so that the longitudinal axis of the through opening 5 is coincident with the axes of the pipes 2 and 3. The scrubbing element 8 can also be removed easily from the piping system by carrying out the procedure which is the reverse of that described in the foregoing.

Two of the scrubbing apparatuses 10 are employed in the self-contained type of system (FIG. 5) and the removable type system (FIG. 4) with the screen means 11 in the through openings 5 of the rods 4 of the scrubbing apparatuses provided at the upstream and downstream sides of the piping system. The present device can be applied to a high pressure piping system or a gas with low viscosity because the scrubbing device 10 is leak tight owing to the packing means 6a, 6b and 6c. In addition to the scrubbing operation, the scrubbing apparatus 10 can also be used for liquid sampling or draining or inspection of the flow condition if the stopper 12b is omitted and if the rod 4 is pushed toward the end of cylinder 1 opposite the handle 9 until the end face of the rod 4 towards the handle 9 is moved beyond the pipes 2 and 3 for providing communication of the pipes 2 and 3 with the atmosphere. In this case, special draining or sampling valve means can be dispensed with. The present device can also be used as an air bleeding valve device when an air bleeding valve is provided on the top of the piping in order to obviate fracturing of the film due to the vacuum in the piping which may be caused by liquid leakage during changeover time, or to bleed the air from the piping during starting, or when the device 10 is mounted at the position of the air bleeding valve. The scrubbing apparatus 10 of the present invention can be used for these multiple purposes in spite of its simple structure. Moreover, if an air cylinder is connected to the rod 4, the device can be remote controlled or automated.

It has been found that the usage of the scrubbing apparatus 10 results in a considerable reduction of the time interval necessary for the insertion and removal of the scrubbing element 8 and considerably improved operational efficiency. With reverse osmosis semipermeable membrane separation apparatuses, the operation is carried out usually at a liquid pressure of 40 to 80 $kg/cm^2$. No leakage of liquid has taken place when the present device is used. It has also been found that the packings 6a, 6b and 6c did not fail after 2000 reciprocating movements of the rod 4. The packings 6a, 6b and 6c can be replaced easily. The scrubbing element 8 can be moved through the system by using the normal liquid flow in the system and it is effective to remove deposited films or layers from the inner surfaces of the tubes. The by-pass 7 in the outer cylinder 1 has been found to work effectively for preventing an excessive rise in the liquid pressure.

In the system of FIG. 4, the fluid flows unidirectionally through the piping 3 and the scrubbing element is inserted at apparatus 10A and it is removed at apparatus 10B. In the system of FIG. 5, the direction of fluid flow through the piping 3 can be reversed by the reversing valve arrangement 15 so that the scrubbing element can be added or removed at either of the apparatuses 10A and 10B. The scrubbing elements can be allowed to remain in the system until they become excessively deteriorated. In both FIG. 4 and FIG. 5, the screens 11 are located so as to block movement of the scrubbing element into the conduits 2 and 2A, while permitting movement of the scrubbing element into piping 3.

The embodiments of the invention in which an exclusive property or privilege is claimed are defined as follows:

1. An apparatus for inserting cleaning elements into pipes, comprising:

an elongated cylinder defining an internal elongated chamber, said cylinder being open at its opposite longitudinal ends and having aligned inlet and outlet flow passages intersecting said chamber between the longitudinal ends thereof;

an elongated rod disposed within said chamber for longitudinal sliding movement therein, said rod having a single transverse through opening adapted to be aligned with said inlet and outlet flow passages in a first position of said rod in said chamber, said rod being longer than said cylinder and having a first imperforate end portion which extends from said through opening through and beyond one longitudinal end of said chamber, said rod having a second imperforate end portion which extends from the opposite side of said through opening to the other longitudinal end of said chamber, said rod being movable between said first position and a second position in which said through opening is positioned outside of said chamber and said first end portion is aligned with said inlet and outlet passages so that cleaning element means can be inserted into said through opening while said first end portion prevents flow of fluid from said inlet and outlet flow passages into said chamber, said cylinder having at least two annular sealing means mounted therein and sealingly contacting the periphery of said rod, one of said sealing means being located on one longitudinal side of said cylinder from said flow passages for continuous sealing engagement with said first end portion and the other of said sealing means being located on the opposite longitudinal side of said cylinder from said flow passages for continuous sealing engagement with said rod.

2. An apparatus as claimed in claim 1 including a third annular sealing means in said cylinder located on said opposite longitudinal side of said cylinder from said flow passages and longitudinally spaced from said other sealing means, said three sealing means being longitudinally spaced apart from each other a distance greater than the diameter of said through opening in said rod.

3. An apparatus as claimed in claim 2 in which said internal wall of said cylinder has an annular groove therein aligned with and communicating with said flow passages and defining a by-pass passage around said rod, said by-pass passage being of substantially smaller cross-sectional area than the through opening in said rod.

4. An apparatus as claimed in claim 2 in which said chamber is of circular cross section and has the same constant diameter on opposite longitudinal sides of said flow passages and said rod is a circular rod of constant diameter.

5. An apparatus as claimed in claim 4 including stoppers mounted on both ends of said rod, said stoppers being of larger size than said chamber and being adapted to abut against the longitudinal ends of said cylinder, and cooperating means on one of said stoppers and on the corresponding end of the cylinder for locating said rod in a circumferentially fixed position relative to said chamber in said first position of said rod.

6. An apparatus as claimed in claim 1 including screen means in said through opening in said rod for preventing movement of said scrubbing element into one of the flow passages while permitting movement of said scrubbing element into the other flow passage and also permitting fluid flow through the screen means.

7. A fluid-flow system comprising a tubular semi-permeable membrane having its opposite ends respectively connected to a flow passage in the cylinders of a pair of apparatuses as claimed in claim 1 so that a scrubbing element placed in the through opening of said rod in one of said apparatuses can be moved through said membrane to scrub a contaminant layer therefrom.

* * * * *